Feb. 6, 1968

J. R. LEMON 3,368,197

SEAT BELT REMINDER SIGNAL

Filed March 5, 1965

INVENTOR.

Joseph R. Lemon

BY

Harness and Harris

ATTORNEYS

United States Patent Office 3,368,197
Patented Feb. 6, 1968

3,368,197
SEAT BELT REMINDER SIGNAL
Joseph R. Lemon, Detroit, Mich., assignor to Chrysler Corporation, Highland Park, Mich., a corporation of Delaware
Filed Mar. 5, 1965, Ser. No. 437,437
6 Claims. (Cl. 340—52)

ABSTRACT OF THE DISCLOSURE

A device for reminding vehicle occupants to fasten their seat belts having a signal unit and a control circuit which is provided with two switches, either of which being effective to preclude the completion of the circuit notwithstanding the operation of the other switch. The signal is actuated when the ignition switch is turned on and the vehicle transmission selector is in a Neutral or Park position. A second switch reponsive to movement of the transmission selector opens the control circuit thereby deenergizing the signal unit when the selector is placed in other than a Neutral or Park position.

Figure 1:
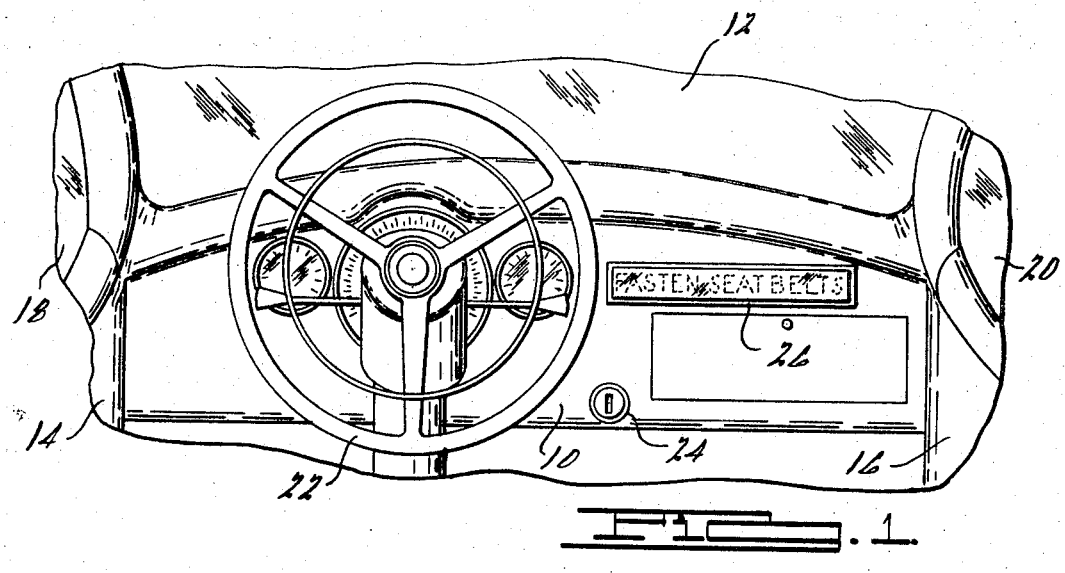

This invention relates generally to vehicle passenger safety restraining devices, such as safety seat belts, and more particularly to arrangements associated therewith for warning or reminding the occupants of a vehicle to secure such safety seat belts before setting the vehicle in motion. Still more particularly, it concerns an electrically actuated instruction device designed to be mounted in an automotive vehicle and which will instruct occupants of the vehicle, at a time when the vehicle is not in motion, to fasten their seat belts.

The effectiveness of seat belts in lessening or preventing injury from automobile accidents is well established. However, a problem remains even when a vehicle is equipped with seat belts in that the occupants of the vehicle frequently forget to use the belts. Such forgetfulness is particularly true of occupants who do not normally ride in a vehicle equipped with seat belts or are riding in a vehicle which is unfamiliar to them. In an effort to remind the occupants of a vehicle to use their seat belts, a number of schemes have been devised ranging from a warning printed on a simple paper decal affixed to the vehicle instrument panel to complex and costly electro-mechanical systems. The difficulty encountered, however, with such known devices is that they are continuously apparent during the time the vehicle is in operation with the result that the vehicle occupants become indifferent to the instruction device and it thereby loses its effectiveness. An equally serious consequence of the constant operation of a warning device is that it often irritates or distracts the driver of the vehicle. Accordingly, it is an object of this invention to provide an improved device for instructing the occupants of a vehicle to fasten their seat belts.

It is a further object to provide an improved safety instruction device which is automatically actuated when the engine of the vehicle to which the device is attached is started and which will automatically be deactivated when the vehicle is put in motion.

It is still another object of this invention to associate the control thereof with the vehicle ignition system and the drive transmission control so that the seat belt instruction device will be jointly controlled thereby.

A still further object is to provide such a device which is inexpensive and convenient to install in the automobile.

In furtherance of the objects, this invention can be practiced by employing signal means for instructing occupants of an automotive vehicle to secure their seat belts which comprises a signal means and control means for governing the operation of the signal means. The control means comprises an electrical circuit having therein a source of electrical potential, an electrical switch means which is effective at times to complete the electrical circuit and additional electrical switch means which is effective at times to preclude the completion of the electrical circuit, notwithstanding the operation of the first above described electrical switch. The first electrical switch means may be a manually operated switch and the additional electrical switch means may be actuated by movement of the vehicle transmission selector means which is connected to the transmission and controls the operation thereof.

Other objects and advantages of this invention will be apparent when reference is made to the following description taken in conjunction with the drawing herein which, by way of illustration, shows preferred embodiments of the present invention although it should be understood that equivalent principles may be used and structural changes may be made by those skilled in the art without departing from the present invention and the purview of the appended claims.

Figure 2:
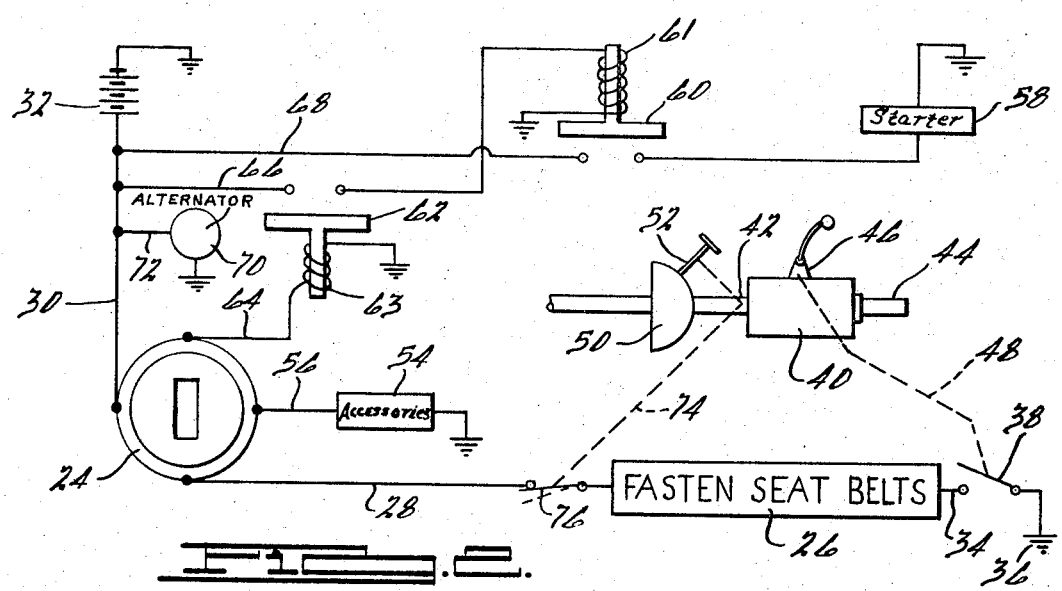

In the drawing:

FIGURE 1 is an elevation view of the instrument panel of a conventional automotive vehicle showing the signal means portion of the invention mounted in operating position; and FIGURE 2 is a schematic electrical circuit diagram for one embodiment of the invention.

Referring now in greater detail to the drawing, FIGURE 1 shows the instrument panel 10 and surrounding area of a conventional automotive vehicle, including the usual windshield 12, doors 14 and 16 having windows 18 and 20 respectively, and the steering wheel 22. The ignition switch for the vehicle is shown at 24. In accordance with the usual practice, the starter switch for the vehicle may be associated with the ignition switch 24 or may be mounted at some other position on the instrument panel 10 or on the floor of the vehicle. In the ensuing discussion, it is assumed that ignition switch 24 includes the starter switch, although this is not necessary to the inventive concept.

FIGURE 1 also shows a signal means or sign indicator 26 bearing the legend "Fasten Seat Belts." Indicator 26 is shown mounted integrally with instrument panel 10 in the upper right hand position of the instrument panel although it should be understood that it may be positioned elsewhere if so desired. Mounting above the instrument panel may be desirable where the system is to be installed after the vehicle has been assembled, in which case the indicator may comprise a separate unit affixed to the instrument panel 10 or to windshield 12 by suction cups, bolts or other suitable means.

The electrical and operational characteristics of the system of this invention may be understood by reference to the schematic circuit diagram of FIGURE 2. As shown in this figure, the signal means 26 is placed in an energizing circuit comprising conductor 28 which connects one terminal of the signal means with a terminal of ignition switch 24 which in turn is connected to a source of electrical potential represented by battery 32 by conductor 30. In a vehicle employing a manual type of transmission a second switch arrangement is preferably provided as at 76 in order to provide a second means for making and breaking the circuit through conductor 28. Conductor 34, connected to the other terminal of signal means 26, is grounded at 36. Electrical switch 38 is interposed in the circuit between signal means 26 and ground 36 and is capable of completing and breaking said circuit in response to gear ratio shifts in transmission 40. Transmission 40 has an input shaft 42 and an output shaft 44 and interconnecting gearing (not shown) that can be placed in Neutral and Drive conditions thereby completing and breaking respectively said circuit. Such conditioning of the transmission is, of course, effected through movement of the transmission selector means 46 which is connected to switch 38 by device 48 which may be electrical or mechanical in nature. Input shaft 42 is connected to the vehicle engine through suitable means such as in the case of a manual transmission a clutch 50 which may be actuated by pedal 52.

The ignition switch 24 disclosed is capable of completing a plurality of circuits. Thus, accessories 54 such as radio, heater, etc., may be energized by a circuit comprising battery 32, conductors 30 and 56 and ignition switch 24. Likewise, vehicle engine starter 58 may be actuated by a circuit connecting the battery 32 to the starter 58 by means of a circuit comprising relays 61 and 63 and conductors 30, 64, 66 and 68. Operating ignition switch 24 to connect battery 32 to ground through conductor 64 will energize relay 63 and close contacts 62. Closing contacts 62 energizes relay 61 to close contacts 60 and condition conductor 68 for energization of starter 58. It will also be appreciated that alternator 70 connected to the ignition switch 24 by conductors 72 and 30 will replace battery 32 as the source of electrical potential when the engine of the vehicle has become self-sustaining.

The signal instruction system of this invention is actuated when ignition switch 24 is turned on so as to complete the engine ignition circuit and the transmission selector means 46 is placed in Neutral or Park thereby causing switch 38 to close by means of device 48. Current then flows from battery 32 through conductor 30, ignition switch 24, conductor 28, switch means 76, signal means 26, conductor 34, switch 38, to ground 36 thereby energizing signal means 26 which may be a lamp or buzzer or both in combination. Generally, signal means 26 and switch 38 are connected in series.

In the discussion of this invention herein it should be understood that when the transmission selector means 46 is stated as being in Neutral or Park position the transmission of the vehicle is so arranged that the input shaft 42 thereof is being driven by the vehicle engine while the output shaft 44 thereof is not being driven. Accordingly, for example, in a vehicle equipped with a manual transmission the signal means 26 will not be energized when the transmission selector means 46 is moved through the neutral position during the course of shifting transmission gears, since during such shifting, the vehicle clutch 50 is disengaged by declutching movement of pedal 52 and the transmission input shaft 42 is therefore not driven by the vehicle engine. Furthermore, the declutching movement of pedal 52 opens switch 76, which is normally closed, by means of device 74 which may be electrical or mechanical in nature. Naturally, device 74 is not needed if the vehicle is equipped with an automatic transmission. However, when present in the circuit, it is generally placed in series with the switch actuated by movement by the transmission selector means 46.

When the vehicle ignition switch 24 also controls the starter circuit, and the driver of the vehicle turns the ignition switch so as to crank the vehicle engine, the signal means 26 will not be energized since current is caused to pass from battery 32 through conductors 30 and 64 thereby energizing relay 63. The closing of this relay's contacts 62 completes conductor 66 which enables current to pass therethrough and energize relay 61. Current may then pass directly from battery 32 through conductor 68 to starter motor 58.

It will be appreciated that ignition switch 24 may also be arranged to complete a third circuit in addition to the starter circuit and signal means circuit described above. The use of such a third circuit to energize certain vehicle accessories is relatively common. Again, if the ignition switch 24 is turned so as to complete such an accessory circuit, signal means 26 will not be energized since current will pass through conductor 30 to conductor 56 and the accessories 54.

From the foregoing description it is apparent that the objects of this invention have been obtained. A seat belt instruction indicator has now been provided which will be actuated when the ignition circuit of the vehicle is energized and the vehicle transmission selector means is in a Neutral or Park position. Accordingly, if the ignition switch is turned off or the transmission is put in a drive gear, the instruction indicator will immediately and automatically be inactivated and, consequently, will not distract or irritate the driver. Thus, the instructional device of this invention is in operation at the times it is most needed as when the driver of the vehicle goes about putting the vehicle in motion or has pulled to the side of the road in order to take on passengers. Furthermore, since the device automatically functions in response to the normal steps that a driver takes in operating a vehicle, the driver need not undertake any additional steps to actuate the instructional device which will divert his attention from driving.

The invention described herein has been successfully used by employing a control means in which the signal means thereof was connected to the source of electrical potential by a normally open energizing circuit having two electrical switch means interposed therein, both of which must be closed in order to complete the energizing circuit. One of the electrical switch means was the vehicle ignition switch while the other switch means was connected to and actuated by the transmission selector. This latter switch is arranged such that the switch is closed when the transmission selector is placed in Neutral as in the case of a manual transmission or in Neutral or Park as in the case of an automatic transmission. The neutral safety switch commonly found on automatic transmissions may be used as the latter switch described above.

While the foregoing illustrates and describes what is contemplated to be the best mode of carrying out the invention, the constructions are, of course, subject to modification without departing from the spirit and scope of the invention. Therefore, I do not desire to restrict the invention to the particular forms of construction illustrated and described, but desire to cover all modifications that may fall within the scope of the appended claims.

I claim:

1. In an automotive vehicle equipped with an engine and a transmission adapted to be driven by said engine, signal means for instructing occupants of said vehicle to secure safety seat belts, and control means for at times actuating said signal means, said control means comprising a source of electrical potential, a vehicle ignition switch which when turned on so as to complete the vehicle ignition circuit will also complete an electrical circuit connecting said source with said signal means, a second electrical switch means interposed in said circuit, said second switch being actuated by movement of a transmission selector means connected to said transmission and being capable of completing and breaking said circuit in response to said transmission being placed in Neutral and a Drive position respectively.

2. In an automotive vehicle equipped with an engine and a transmission adapted to be driven by said engine, signal means for instructing occupants of said vehicle to secure safety belts, and control means for at times actuating said signal means, said control means comprising a source of electrical potential, a first electrical switch, said first electrical switch being capable of completing a plurality of electrical circuits, a second electrical switch, said second electrical switch being actuated by movement of a transmission selector means connected to said transmission and being capable of completing and breaking a circuit in response to said transmission being placed in Neutral and a Drive position respectively, said signal means, said source and said second electrical switch being in a common electrical circuit which is one of the plurality of circuits between which said first electrical switch is interposed.

3. In an automotive vehicle equipped with an engine and a transmission adapted to be driven by said engine, signal means for instructing occupants of said vehicle to secure safety seat belts, and control means for at times actuating said signal means, said control means comprising a source of electrical potential, a first electrical switch, said first electrical switch being capable of completing a first and a second electrical circuit, a second electrical switch, said second electrical switch being adapted to be closed and opened in response to said transmission being placed in Neutral and a Drive position respectively, said second electrical switch and said signal means being connected in series in said first electrical circuit, said first electrical switch being effective to complete only said second circuit in order to energize by said source of electrical potential a suitable cranking device for starting said engine and said first electrical switch being further effective to complete said first electrical circuit to energize by said source of electrical potential said signal means.

4. The arrangement of claim 3 wherein the signal means is an electrically actuated visual indicator.

5. The arrangement of claim 3 wherein the first electrical switch is the ignition switch of the vehicle.

6. The arrangement of claim 3 wherein the source of electrical potential is a battery.

References Cited

UNITED STATES PATENTS 2,824,293   2/1958   Meinhardt _____ 340—52
3,226,674   12/1965  Eriksson _____ 340—53

THOMAS B. HABECKER, *Acting Primary Examiner.*

NEIL C. READ, *Examiner.*

A. H. WARING, *Assistant Examiner.*